Jan. 29, 1929.
N. STACHNYK
1,700,384
LAND AND WATER VEHICLE
Filed March 9, 1928    3 Sheets-Sheet 1
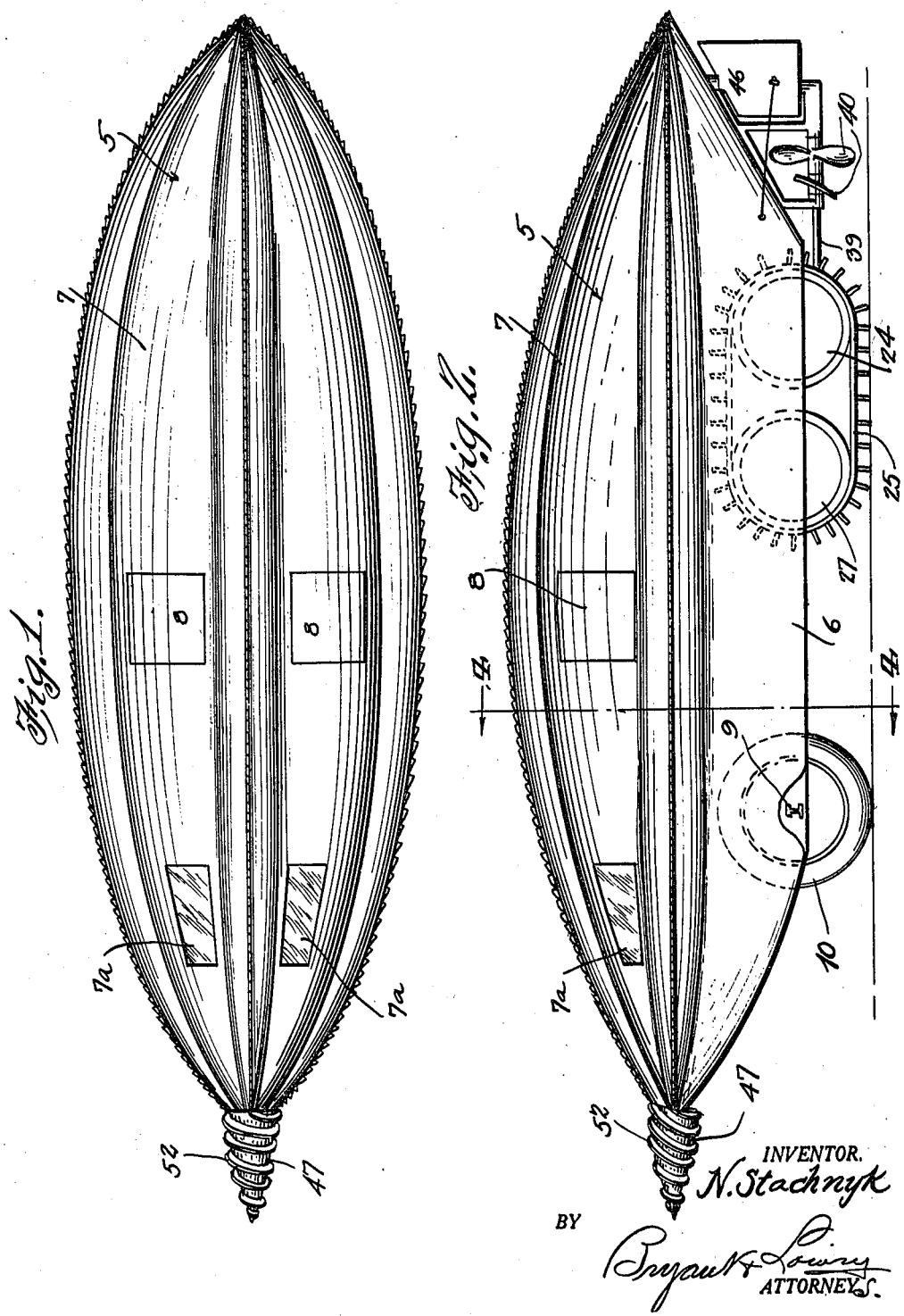
INVENTOR.
N. Stachnyk
BY
Bryant & Lowry
ATTORNEYS.

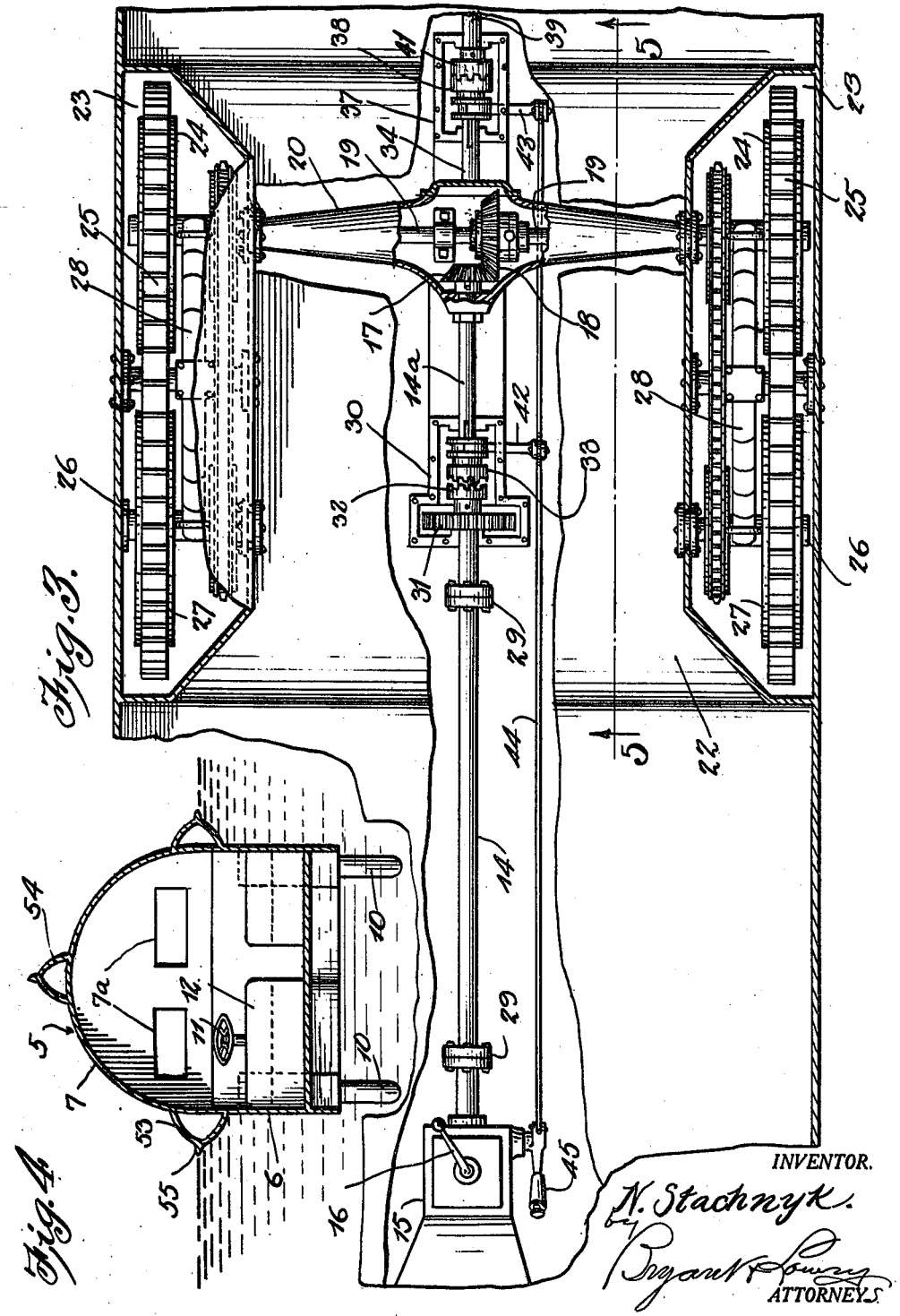

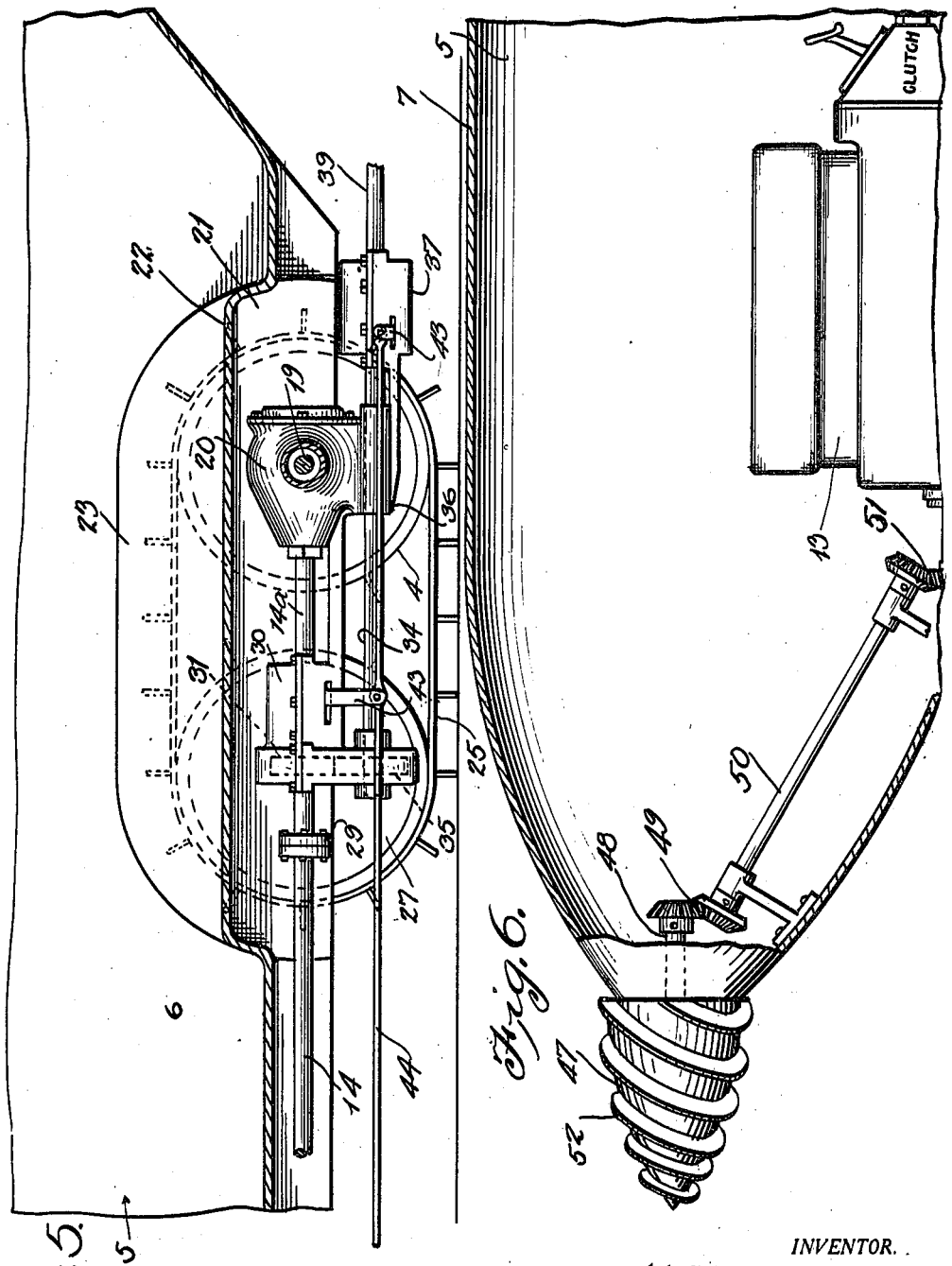

Patented Jan. 29, 1929.

1,700,384

UNITED STATES PATENT OFFICE.

NICHOLAS STACHNYK, OF MOOSE JAW, SASKATCHEWAN, CANADA, ASSIGNOR OF ONE-THIRD TO DMYTRO SOSIAK, OF MOOSE JAW, SASKATCHEWAN, CANADA.

LAND AND WATER VEHICLE.

Application filed March 9, 1928. Serial No. 260,371.

This invention relates to land and water vehicles, and has particular reference to an improved form of vehicle adapted to be self-propelled and to travel upon the water as well as upon land.

The primary object of the present invention is to provide simple and efficient means for propelling and facilitating movement of the vehicle through the water when partly or completely submerged.

Another object is to provide simple and efficient means for maintaining the vehicle upon an even keel when either partly or wholly submerged and travelling upon the water, and for further facilitating the travel of the vehicle by the provision of efficient means for cutting through seaweed and other obstructions.

Still another object is to provide simple and efficient interchangeable driving mechanism for selectively connecting the driving motor of the vehicle with the land traction elements or the rear propeller.

Other objects will appear as the nature of the invention is better understood and the same consists in the novel form, combination and arrangement of parts hereinafter more fully described, shown in the accompanying drawings and claimed.

In the drawings, wherein like reference characters indicate corresponding parts throughout the several views, Figure 1 is a top plan view of a land and water vehicle embodying the present invention;

Figure 2 is a side elevational view of the same;

Figure 3 is an enlarged fragmentary horizontal section, showing details of the interchangeable driving means for the rear land section element and the rear propeller;

Figure 4 is a transverse section on line 4—4 of Figure 2;

Figure 5 is a fragmentary longitudinal section on line 5—5 of Figure 3; and

Figure 6 is a fragmentary view, partly in elevation and partly in longitudinal section, showing the driving motor and means for operatively connecting it with the propeller at the front of the vehicle.

Referring more in detail to the drawings, 5 indicates the body of the vehicle which is of hollow water-tight construction and tapers to substantially pointed front and rear ends as clearly shown in Figures 1 and 2, the body affording a lower hull portion 6 and an enclosing upper portion 7 provided with forward windows 7ª so that the driver may have sufficient view ahead and to the sides to enable him to properly steer the vehicle. The body is further provided with side doors 8 for the entrance and exit for the driver and passengers.

Provided at the forward end portion of the body 5 and across the hull portion 6 is a front axle 9 equipped with front steering and supporting wheels 10 as commonly practiced with land motor vehicle constructions. A suitable steering wheel 11 for deflecting the supporting wheels 10 being provided within the forward portion of the body 5 in front of the driver's seat 12, whereby the course of the vehicle when travelling upon land may be controlled.

Suitably mounted in the front end of the body 5 is a motor 13 (Fig. 6) whose power shaft is adapted to be connected with a rearwardly extending longitudinal propeller shaft 14 through the medium of a conventional change speed and reversing transmission mechanism provided at the rear of the motor 13 as at 15, said transmission mechanism being of a well known form commonly employed in land motor vehicle construction and having a gear shift lever 16, the purpose of which is obvious. The propeller shaft 14 extends through the bottom of the hull portion 6 of the body and is equipped at its rear end with a pinion 17 meshing with the driving gear 18 of a differential gearing connecting rear axle sections 19 arranged within the rear axle housing 20 As shown clearly in Figures 3 and 5, the rear axle housing 20 is disposed transversely beneath the rear portion of the hull part 6 of the body 5 and protected and partly housed within a chamber 21 formed in the bottom of the hull by upwardly shaping the adjacent portion of the latter as at 22. Provided at the sides of the rear portion of the hull 6 are open bottom chambers 23 outwardly into the rear portions of which the outer ends of the rear axle sections 19 project, and mounted upon these projecting ends of the axle sections 19 are drive wheels 24 about which the endless traction elements or caterpillar treads 25 are passed. Mounted within the forward end portions of the chambers 23 are transverse jack shafts 26 which carry guide wheels 27 alined with the respective drive wheels 24 and about which the endless traction elements 25 also pass. In this way, the traction elements are effectively driven and guided so that the lower strands thereof are caused to travel horizontally in a plane below the bottom of the hull so that the vehicle may be readily driven and caused to travel upon the land, the endless traction element insuring proper propulsion in soft ground such as will be encountered when passing out of the water onto the land. The rear axle housing and the shaft 26 may be suitably allowed vertical play, and spring suspension 28 may be provided between them and the hull of the body to ensure riding comfort when travelling upon rough ground, such relative movement between the traction devices and the body being permitted by the provision of universal joints 29 between sections of the propeller shaft 14 as is well known in motor vehicle construction.

The propeller shaft 14 includes a main forward section and a separate rear section 14$^a$, the adjacent ends of which terminate within a gear casing 30 suitably mounted in front of the rear axle housing 20, and fixed upon the rear end of the forward section of the propeller shaft 14 is a spur gear 31 having a rigid clutch element 42. Slidably keyed on the forward end of the propeller shaft section 14$^a$ is a clutch element 33 adapted to be slid forwardly into engagement with the clutch element 32 so as to operatively connect the propeller shaft sections 14 and 14$^a$ to transmit the drive from the engine to the rear axle sections 19. Obviously, by disengaging the clutch element 33 from the clutch element 32 as shown in Figure 3, the rear propeller shaft section 14$^a$ will be disconnected so that the traction element 25 will not be driven. Arranged beneath the rear propeller shaft section 14$^a$ is an auxiliary propeller shaft 34 whose forward end carries a spur gear 35 within the bottom of the gear casing 30 and constantly meshing with the spur gear 31. The auxiliary propeller shaft 34 is supported by a bearing 36 on the bottom of the rear axle housing 20 and projects rearwardly into a clutch housing 37 suitably mounted at the rear of the rear axle housing 20 where it is provided with a slidably keyed clutch element 38. Suitably mounted in line with and at the rear of the auxiliary propeller shaft 34 is a further shaft 39 upon which is fastened the rear propeller 40 which is adapted to be driven for causing the forward travel of the vehicle through water, and fixed upon the forward end of this shaft 39 within the casing 37 is a clutch element 41 with which the clutch element is adapted to be selectively engaged or disengaged. It will thus be seen that when the clutch element 38 is disengaged from the clutch element 41, the shaft 39 will be disconnected from the auxiliary propeller shaft 34 and driving of the propeller 40 will be discontinued, while driving of said propeller will be effected by engagement of the clutch element 38 with said clutch element 41. Means is provided for engaging either clutch element 33 or 38 with its associated clutch element 32 or 41 while disengaging the other of said clutch elements 33 or 38 from its associated clutch element so that the motor 13 may be utilized for selectively driving the land traction elements or the rear propeller 40 as desired. For this purpose, the clutch elements 33 and 38 have shifting forks 42 and 43 connected by an operating rod 44 with an actuating lever 45 mounted in front of the driver's seat adjacent the gear shift lever 16. As the engaging movement of clutch element 32 is opposite to the engagement of clutch element 38, it will be apparent that forward movement of the shifting forks 42 and 43 will effect connection of the propeller shaft sections 14$^a$ with the forward sections of the propeller shaft so as to transmit the drive to the land traction element, while simultaneously disconnecting the shaft 39 from the auxiliary propeller shaft 34 so as to render the propeller 40 idle or inoperative. Obviously a reversal of this operation will result in rendering the propeller shaft sections 14$^a$ idle and connecting shaft 39 with auxiliary propeller shaft 34 whereby the propeller 40 will be driven when the land traction elements are rendered inoperative. Thus, the proper driving elements may be selectively driven at different speeds by a single motor under the convenient control of the driver of the vehicle. A suitable rudder 46 is provided at the rear end of the body 5 for use in steering the vehicle when in the water, and a suitable mechanism being provided for actuating the rudder from the driver's seat.

In order to aid the propeller 40 in causing travel of the vehicle through the water and effectively penetrate seaweed and other similar obstructions, I provide a special propeller 47 at the front of the vehicle for drawing the latter in its wake. This propeller 47 is carried by a horizontal shaft 48 journaled through the front end of the body 5 and suitably connected at its inner end to the power shaft of the engine 13 as at 49, 50 and 51 for actuation by said engine 13. It is preferred that the gearing at 51 be such that the gear upon the power shaft of the engine may be disengaged from the cooperating gear of the shaft 50 for rendering the propeller 47 operative or inoperative at will. Such a mechanism is of obvious construction and utility and its disclosure is accordingly deemed unnecessary, the specific construction thereof embodying no part of the present invention. The propeller 47 comprises a cone whose base covers the front end of the vehicle body and is of substantially the same diameter as said end of the body, the cone carrying a helical external blade or rib 52 of suitable pitch so that when the propeller is rotated in the proper direction by the engine, said propeller produces a vacuum in front of the vehicle, which, in conjunction with the boring action of the screw, materially assists in the propulsion of the vehicle through the water, especially when completely submerged.

Provided upon the sides of the body 5 and extending horizontally from end to end of the latter are lateral ballasting fins 53 which are of hollow airtight construction and are adapted for maintaining the vehicle upon an even keel when travelling through the water in partly submerged position as indicated in Figure 4. A further hollow airtight fin 54 of similar construction is provided centrally upon the top of the body and extends from end to end of the latter for aiding in maintaining the vehicle upon an even keel when fully submerged. The fins 53 and 54 taper to an edge at their outer sides, and these edges are preferably of saw tooth formation as at 55 to aid in cutting through seaweed and like obstructions. It will of course be understood that the fins 53 and 54 are substantially in the nature of floats in view of their hollow airtight form, and these fins are suitably reinforced to withstand severe usage.

It is particularly pointed out that the present vehicle will be especially serviceable for use as an implement of warfare when travelling upon land, the forward propeller 47 and fins 53 and 54 being then particularly adapted for cutting through dense growths of vegetation, wire entanglements and the like.

In operation, the vehicle is caused to travel ahead upon the land by engaging clutch element 33 with clutch element 32 and simultaneously disengaging clutch element 38 from clutch element 41 to render the propeller 40 inoperative. The propeller 47 is of course allowed to idle at this time and a suitable clutch may be interposed between the power shaft of the engine 13 and the transmission gearing 15 to permit the usual neutralization and shifting of gears. By operating the steering wheel 11 for deflecting the supporting wheels 10 at the front of the vehicle, the latter may be properly directed as to its course of travel. By reason of the use of caterpillar traction means including the endless traction elements 25, the vehicle is well adapted for efficient propulsion upon soft ground and it is therefore evident that the vehicle may be readily propelled into or out of water where the ground is muddy or soft. When travelling in the water, the clutch element 33 is disengaged from the clutch element 32 by rearward movement of rod 44, simultaneously causing engagement of clutch element 38 with clutch element 41 and driving propeller 40 while rendering the land traction devices inoperative. The propeller 47 is suitably connected to the motor for actuation at this time and will aid the propeller 40 considerably in propelling the vehicle. The fins 53 will maintain the device upon an even keel, while its course may be directed by operation of the rudder 46, and by the provision of suitable means for varying the degree of submersion of the vehicle, the propeller 47 may be caused to be completely submerged and likewise with respect to the fin 54.

Minor changes may be made without departing from the spirit and scope of the invention, as claimed.

What I claim as new is:—

1. In a self-propelled land and water vehicle, a body; a motor therein, a main drive shaft, change-speed transmission gearing for connecting the motor to said main drive shaft, said main drive shaft embodying a front section extending from the transmission gearing of a rear section, rear land traction elements, a differential gearing between said traction elements and the rear main drive shaft section, an auxiliary drive shaft constantly geared to the front section of the main drive shaft, a screw propeller-carrying shaft alined with and mounted at the rear of the auxiliary drive shaft, and manually operable means to connect the sections of the main drive shaft and simultaneously disconnect the auxiliary drive shaft and the propeller-carrying shaft, or vice versa.

2. In a self-propelled land and water vehicle, a body, a motor therein, a main drive shaft, change-speed transmission gearing for connecting the motor to said main drive shaft, said main drive shaft embodying a front section extending from the transmission gearing of a rear section, rear land traction elements, a differential gearing between said traction elements and the rear main drive shaft section, an auxiliary drive shaft constantly geared to the front section of the main drive shaft, a screw propeller-carrying shaft alined with and mounted at the rear of the auxiliary drive shaft, manually operable means to connect the sections of the main drive shaft and simultaneously disconnect the auxiliary drive shaft and the propeller-carrying shaft, or vice versa, said last named means embodying clutch elements movable in opposite directions to engage positions, and a common operating rod for said clutch elements.

In testimony whereof I affix my signature.

NICHOLAS STACHNYK.